Sept. 5, 1939.  E. D. KOWAL  2,172,084
FOOD DECORATION AND METHOD OF MAKING THE SAME
Filed June 14, 1937
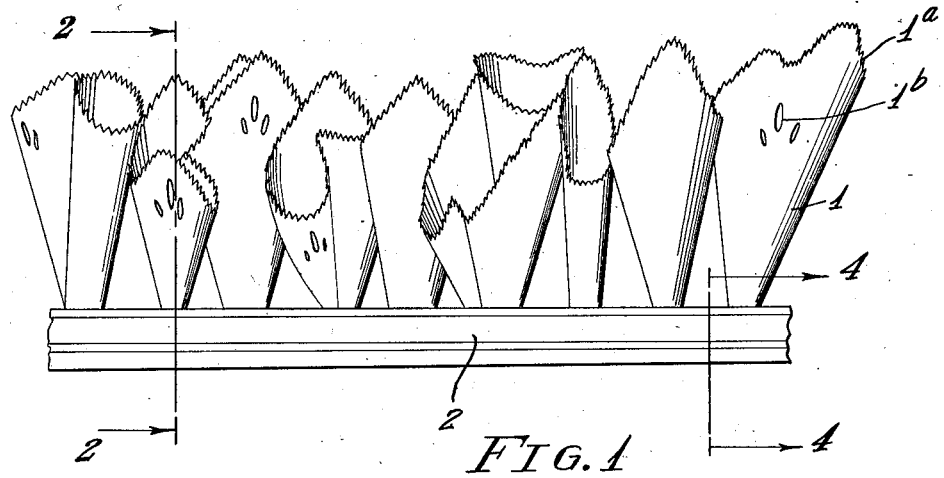
Fig. 1
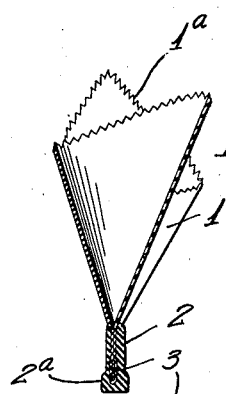
Fig. 2
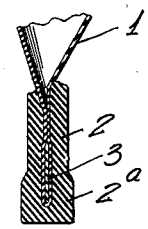
Fig. 3
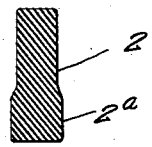
Fig. 4
Fig. 6
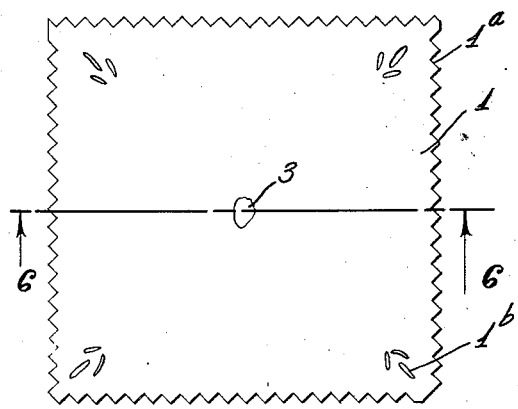
Fig. 5
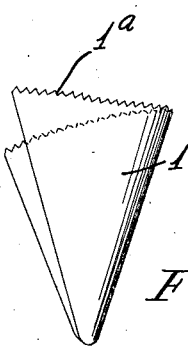
Fig. 7
INVENTOR.
Etha D. Kowal
BY A. B. Bowman
ATTORNEY.

Patented Sept. 5, 1939

2,172,084

UNITED STATES PATENT OFFICE 2,172,084

FOOD DECORATION AND METHOD OF MAKING THE SAME

Etha D. Kowal, San Diego, Calif., assignor of one-half to John Kowal and one-half to William S. Rench, both of San Diego, Calif.

Application June 14, 1937, Serial No. 148,118

6 Claims. (Cl. 41—13)

My invention relates to a food decoration for simulating greens, such as parsely, spinach, carrot tops, lettuce etc. which are used in meat markets and grocery stores for decorating the show cases, show windows etc., and the objects of my invention are:

First, to provide a novel decoration of this class which is sanitary and washable;

Second, to provide a food decoration of this class which is flexible longitudinally of the strip so that it may be shaped into curves or irregular forms if desired;

Third, to provide a food decoration of this class which may be made into strips, which strips are a single substantially integral unit;

Fourth, to provide a food decoration of this class in which the simulating portions are in slightly spaced relations to each other at their base;

Fifth, to provide a food decoration of this class which is largely made up of a number of relatively small square sheets of rubber or other like material so that small pieces of scrap rubber may be used;

Sixth, to provide a novel method of preparing food decoration; and

Seventh, to provide a novel method of connecting the separate and individual green simulating means with the base portion.

With these and other objects in view as will appear hereinafter, my invention consists of such novel features of construction, combination, and arrangement of parts and portions and a certain method of making said food decorations as will be hereinafter described in detail and particularly set forth in the appended claims reference being had to the accompanying drawing and to the characters of reference thereon which form a part of this application in which:

Figure 1 is a side elevational view of a fragmentary portion of a strip of my food decoration ready for use; Fig. 2 is a transverse sectional view from the line 2—2 of Fig. 1; Fig. 3 is a similar view to that of Fig. 2 showing the section on an enlarged scale and showing the upper portion fragmentarily; Fig. 4 is a transverse sectional view through the base portion from the line 4—4 of Fig. 1; Fig. 5 is a plan view of one of the square sheets used in making the individual imitation wreath members; Fig. 6 is a sectional view thereof from the line 6—6 of Fig. 5; and Fig. 7 is a diagrammatic view of the sheet shown in Fig. 5 folded at the middle to form the imitation wreath.

Similar characters of reference refer to similar parts and portions throughout the several views of the drawing:

The individual portions 1 which make up the imitation green foliage each is made of a square sheet as shown best in Fig. 5 of the drawing, provided with notches 1a at its margins and provided with cutout portions 1b in the body portion spaced from the margin. These cutout portions may be various figures and the notches 1a may be of various figures to provide for various forms of imitation foliage, the same being made to imitate greens of various kinds such as spinach, parsley, carrot tops, lettuce etc. and the members 1 are preferably made of thin sheet green rubber of various shades as desired. The base member 2 may be a single sheet doubled of substantial thickness as shown best in Figs. 2, 3 and 4 of the drawing, or may be trough like members slitted at the middle of their upper side and properly divided with a broad spaced portion.

In making up the strip as shown in Fig. 1 of the drawing the members 1 are cut as shown in Fig. 5 of the drawing and a small bunch 3 of raw rubber positioned in the center as shown best in Figs. 5 and 6 of the drawing. The square member 1 is then folded at the center and formed into a leaflike member as shown in Fig. 7 of the drawing with the bunch of raw rubber 3 in the pointed end at the center on the inside. These sheet members are then placed between the upwardly extending sides on the member 2 in a form for forming the same as shown in Figs. 3 and 4 of the drawing and after a strip is formed with several of these in position, the members 1 and 2, both of which are formed of rubber, and preferably both green of the shade desired, the members are vulcanized thus providing a single integral unit of the members 1 and 2 as shown best in Figs. 2 and 3 of the drawing, and the space between the members is made a single piece as shown in Fig. 4 of the drawing. Thus it will be noted that dirt or other deleterious matter cannot get into the base portion around the stems of the members 1, thus providing a very sanitary decoration of this class, and also providing a member that is flexible and may be easily washed and cleansed of all deleterious matter.

Though I have shown a particular construction, combination, and arrangement of parts and portions, and a particular method of making the same, I do not wish to be limited to this particular construction, combination, and arrangement, nor to the method here described, but desire to include in the scope of my invention the construction, combination, and arrangement substantially as set forth in the appended claims.

Having thus described my invention, what I claim as new and desire to secure by Letters Patent is:

1. In a food decoration simulating green foliage, a rectangular sheet of rubber with notches covering its whole margins and perforations therein at each corner folded outwardly from its center to form a pointed foliage simulating member.

2. In a food decoration simulating green foliage, a rectangular sheet of rubber with notches covering its whole margins and perforations therein at each corner folded outwardly from its center to form a pointed foliage simulating member, and a base member formed of rubber integrally secured around each pointed member and made a part thereof.

3. The herein described method of making food decoration simulating green foliage consisting of cutting sheet rubber into small square sheets, then notching the whole margins thereof, then placing a small bunch of raw rubber in the center thereof, then folding the same at the center with the bunch of rubber in the pointed end at the center and, then placing the pointed ends in a trough like rubber base member, and then vulcanizing the same to form a watertight joint around and with the same.

4. The herein described method of making food decoration simulating green foliage consisting of cutting sheet rubber into small square sheets, then notching the whole margins thereof, then placing a small bunch of raw rubber in the center thereof, then folding the same at the center with the bunch of rubber in the pointed end at the center and, then placing the pointed ends in a trough like rubber base member, and then vulcanizing the same to form a watertight joint around and with the same, then cutting the strips into suitable lengths.

5. In a food decoration simulating green foliage, a plurality of separate square green colored rubber sheets with fringed edges each folded from its center outwardly to form a substantially pointed end of the center portion, and a rubber base member formed of a strip integrally connected around the central pointed portion of each of said rubber sheets and forming a tight joint therewith at its upper edge and down to the pointed end.

6. The herein described method of making food decoration simulating green foliage consisting of cutting sheet rubber into a plurality of small square sheets, then notching the whole margin of each small square sheet, then folding each sheet from the middle outwardly with a bunch of rubber in the center forming a substantially pointed end with the middle portion of each square sheet, then placing the pointed ends separately in a trough like rubber base member open at its upper side its full length, then vulcanizing the same tightly around the central pointed portion of each square sheet including the bunch of rubber.

ETHA D. KOWAL.